(12) United States Patent
Ingram (10) Patent No.: US 10,857,542 B2
(45) Date of Patent: Dec. 8, 2020

(54) BEARING BLOCK ASSEMBLY FOR A PLANT TRIMMING MACHINE

(71) Applicant: Keirton Inc., Surrey (CA)

(72) Inventor: Erik Ingram, Abbotsford (CA)

(73) Assignee: KEIRTON INC., Surrey (CA)

( * ) Notice: Subject to any disclaimer, the term of this patent is extended or adjusted under 35 U.S.C. 154(b) by 157 days.

(21) Appl. No.: 16/316,740

(22) PCT Filed: Jul. 11, 2016

(86) PCT No.: PCT/CA2016/050814
§ 371 (c)(1),
(2) Date: Jan. 10, 2019

(87) PCT Pub. No.: WO2018/009999
PCT Pub. Date: Jan. 18, 2018

(65) Prior Publication Data
US 2019/0224687 A1    Jul. 25, 2019

(51) Int. Cl.
*A01G 3/00* (2006.01)
*B02C 17/18* (2006.01)
(Continued)

(52) U.S. Cl.
CPC .............. *B02C 17/181* (2013.01); *A01G 3/00* (2013.01); *A01G 3/037* (2013.01); *A23N 15/00* (2013.01); *B02C 17/002* (2013.01); *B02C 17/02* (2013.01)

(58) Field of Classification Search
CPC ........ A01G 3/00; A01G 3/037; A01G 3/0435; A01G 2003/005; B26D 1/36; B26D 1/38;
(Continued)

(56) References Cited

U.S. PATENT DOCUMENTS 8,757,524 B2 * 6/2014 Mosman ................. A01G 3/00
241/30
9,161,566 B2 * 10/2015 Hall ......................... B26D 1/36
(Continued)

FOREIGN PATENT DOCUMENTS

CA       2775457 A1    11/2012
CA       2815592 A1    11/2014
(Continued)

*Primary Examiner* — Robert E Pezzuto
*Assistant Examiner* — Adam J Behrens
(74) *Attorney, Agent, or Firm* — Kirton McConkie; Evan R. Witt (57) ABSTRACT

A bearing block assembly for a plant-trimming machine having a rotatable perforated tumbler, a rotatable reel and a bed bar assembly. The bearing block assembly comprises an outer bearing plate having a bearing-receiving bore for holding a reel bearing to rotatably support an end of the reel, and an inner bearing plate affixed to the outer bearing plate. The inner bearing plate has a pocket for receiving the bearing-receiving bore of the outer bearing plate, the pocket having a tolerance permitting the bearing-receiving bore to be set at a selected position within the pocket. The bearing block assembly has connectors for affixing the outer bearing plate to the inner bearing plate. The bearing block assembly sets the positions of the reel, bed knife and tumbler correctly during assembly of the plant-trimming machine, reducing the time and skill required for maintenance.

12 Claims, 9 Drawing Sheets

(51) Int. Cl.
*A23N 15/00* (2006.01)
*A01G 3/037* (2006.01)
*B02C 17/00* (2006.01)
*B02C 17/02* (2006.01)

(58) Field of Classification Search
CPC .......... B26D 1/40; A23N 15/00; A23N 15/02; A23N 15/06; B02C 17/181; B02C 17/002; B02C 17/02
See application file for complete search history.

(56) References Cited

U.S. PATENT DOCUMENTS

| | | | | |
|---|---|---|---|---|
| 9,636,838 | B2* | 5/2017 | Evans | B26D 7/2614 |
| 10,415,740 | B2* | 9/2019 | Evans | B26D 7/0641 |
| 2012/0279193 | A1* | 11/2012 | Mosman | A01G 3/00 |
| | | | | 56/233 |
| 2013/0175372 | A1* | 7/2013 | Mosman | B02C 18/16 |
| | | | | 241/25 |
| 2014/0087794 | A1* | 3/2014 | Hall | A23N 15/06 |
| | | | | 460/123 |
| 2014/0196587 | A1* | 7/2014 | Beyerlein | A01G 3/08 |
| | | | | 83/312 |
| 2015/0285427 | A1* | 10/2015 | Evans | B26D 1/02 |
| | | | | 83/859 |
| 2015/0290827 | A1* | 10/2015 | Evans | B26D 1/40 |
| | | | | 83/698.11 |
| 2017/0164557 | A1* | 6/2017 | Harold | A01D 46/02 |
| 2018/0279564 | A1* | 10/2018 | McKellar | A01D 46/02 |
| 2019/0070741 | A1* | 3/2019 | Ingram | A01G 3/08 |
| 2019/0224687 | A1* | 7/2019 | Ingram | A01G 3/037 |
| 2019/0297782 | A1* | 10/2019 | Mosman | A01G 5/00 |
| 2019/0299218 | A1* | 10/2019 | Camaren | B02C 17/02 |
| 2019/0388902 | A1* | 12/2019 | Hall | A23N 15/02 |

FOREIGN PATENT DOCUMENTS

| | | |
|---|---|---|
| CA | 2818320 A1 | 11/2014 |
| CA | 2820055 A1 | 1/2015 |

* cited by examiner

BEARING BLOCK ASSEMBLY FOR A PLANT TRIMMING MACHINE

TECHNICAL FIELD

The present invention pertains to bearing blocks, and in particular, to bearing block assemblies for plant trimming machines.

BACKGROUND

It is known in the plant-trimming art to employ a plant trimming machine which comprises a rotatable perforated tumbler and a cutting mechanism that includes a rotatable reel with helical blades, and a bed bar with a bed knife. In operation, plant material such as aromatic herbs that requires trimming is fed into the rotating tumbler, parts of the plant material protrude through the perforations in the tumbler, and the cutting mechanism cuts the protruding plant material in a scissor-like shearing action as the helical blades of the rotatable reel pass over the stationary bed knife. Examples of such machines are disclosed in WO 2014/183209, WO 2014/190425 and WO 2015/003256.

In conventional plant-trimming machines of this type, the rotatable reel is supported at each end by bearing blocks that are affixed to the respective end plates of the machine. Each bearing block holds a bearing arranged to rotatably support a respective end of the shaft of the reel. The relative positions of the reel and the bed knife have to be set with precision in order for the machines to operate properly. The machines have to be regularly disassembled for cleaning and maintenance and then re-assembled. Setting the positions of the reel and bed knife correctly during re-assembly is time-consuming and requires highly-skilled labor. It would be desirable to be able to avoid this drawback of conventional plant-trimming machines.

SUMMARY OF THE INVENTION

One aspect of the invention provides a bearing block assembly for a plant-trimming machine having a rotatable tumbler, a rotatable reel and a bed bar assembly. The bearing block assembly comprises means for setting a selected position of the reel relative to the bed bar assembly. Optionally, the bearing block assembly further comprises means for setting the position of the tumbler relative to the reel and the bed bar assembly.

Another aspect of the invention provides a bearing block assembly for a plant-trimming apparatus having a rotatable perforated tumbler, a rotatable reel and a bed bar assembly. The bearing block assembly comprises a first bearing plate having a first bearing-receiving bore for holding a reel bearing to rotatably support an end of the reel, and a second bearing plate affixed to the first bearing plate. The second bearing plate has a pocket for receiving the first bearing-receiving bore of the first bearing plate, the pocket having a tolerance permitting the bearing-receiving bore to be set at a selected position within the pocket. The second bearing plate also has a contact surface for engagement with the bed bar assembly and, optionally a second bearing-receiving bore for holding a bearing for a rotatable tumbler support.

Another aspect of the invention provides a plant-trimming apparatus comprising a rotatable perforated tumbler, a rotatable reel, a bed bar assembly, two end plates, and two bearing block assemblies as described in the two preceding paragraphs.

Further aspects of the invention and features of specific embodiments of the invention are described below.

BRIEF DESCRIPTION OF THE DRAWINGS

In drawings which illustrate non-limiting embodiments of the invention.

DETAILED DESCRIPTION OF THE INVENTION

Referring first to FIGS. 1 to 4, a plant trimming machine 10 which incorporates the bearing block assemblies 100, 102 of the invention has a front plate 12, two end plates 14, 15 mounted on the left and right sides respectively of the machine 10, a cutting mechanism 16 removably mounted on the end plates 14, 15, and a removable rotatable tumbler 18, having a plurality of holes 22, adjacent to the cutting mechanism 16. The plant trimming machine 10 has a removable lid 24, shown in FIG. 2, to cover the tumbler 18 and the cutting mechanism 16.

The cutting mechanism 16 (best seen in FIG. 4) includes a reel 26, a bed bar 34 and a bed knife 36. The bed knife 36 is bolted to the bed bar 34 to form a bed bar assembly 32. The reel 26 comprises several helical blades 28 that are mounted to a rotatable shaft 30. The reel 26 is positioned adjacent to the bed bar assembly 32 and the tumbler 18.

Figure 1:
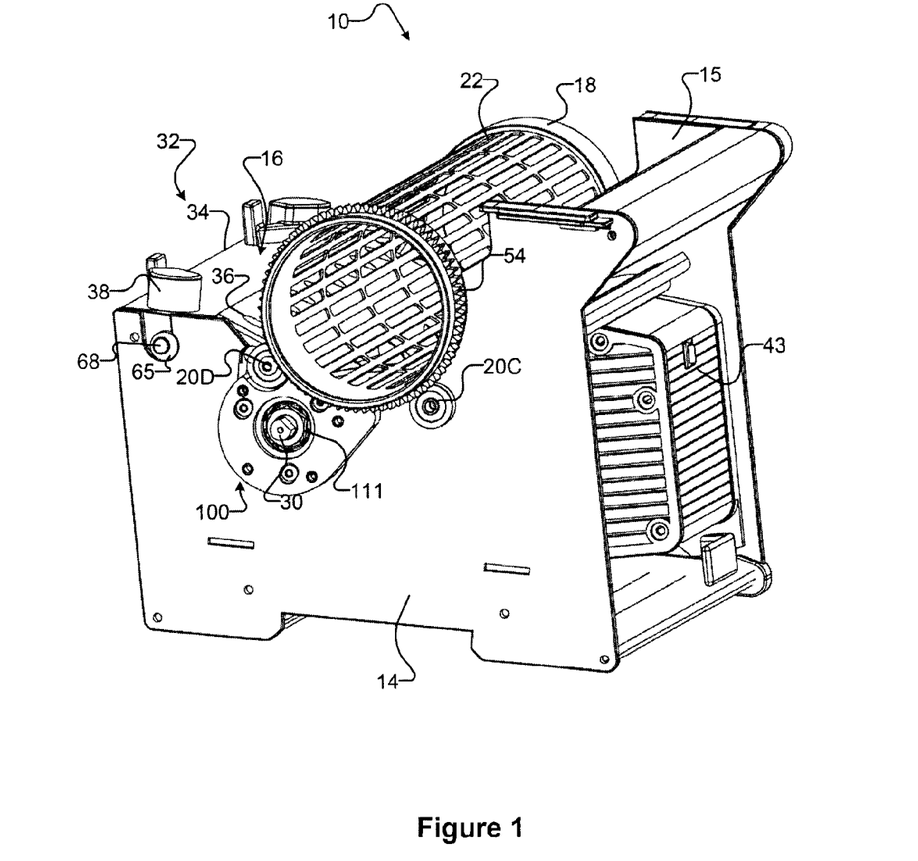
FIG. 1 is a perspective view of a plant trimming machine having bearing block assemblies according to one embodiment of the invention.
Figure 2:
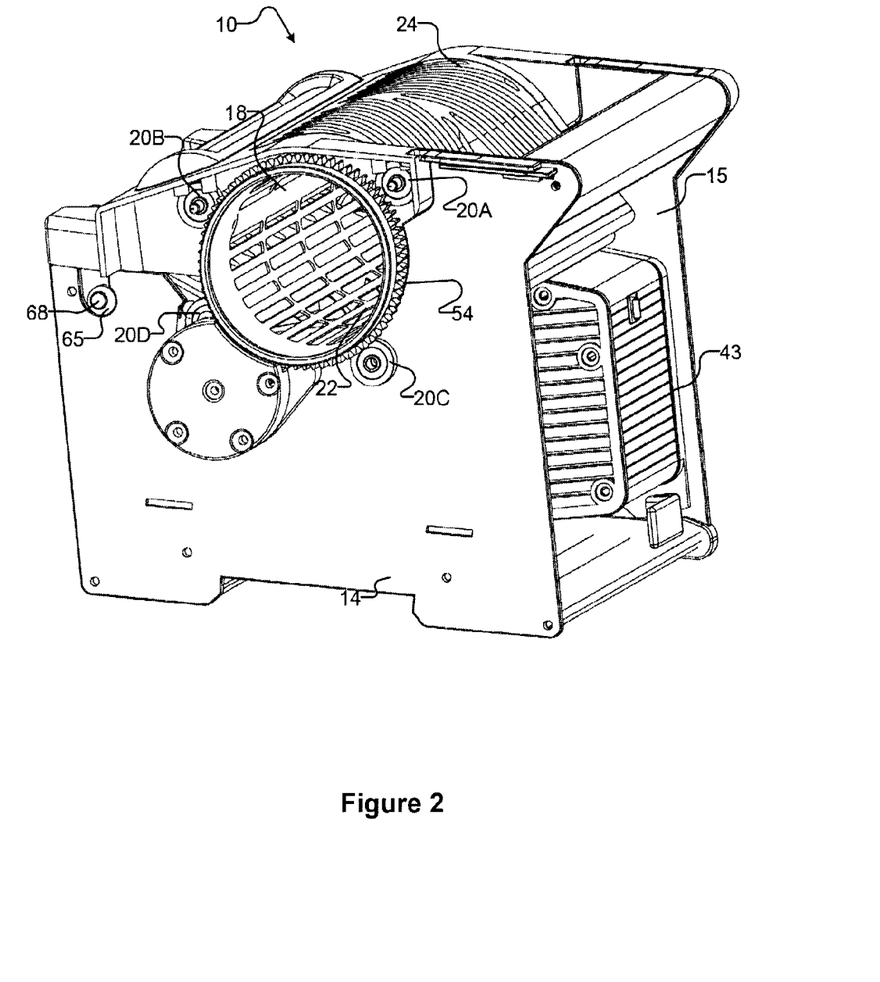
FIG. 2 is a perspective view of the machine of FIG. 1 showing the plant trimming machine with its removable lid.
Figure 3:
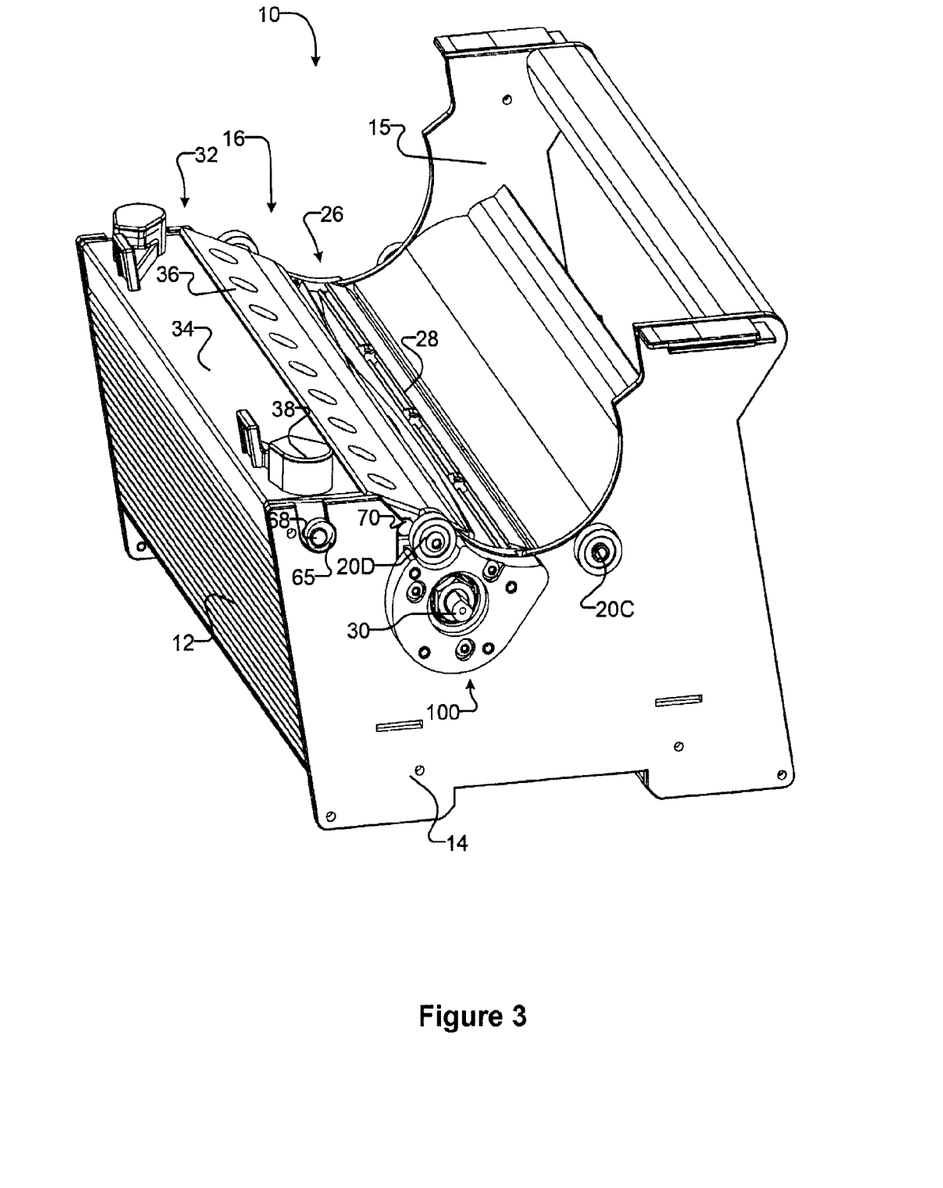
FIG. 3 is a perspective side view of the machine of FIG. 1 without its lid and tumbler.
Figure 4:
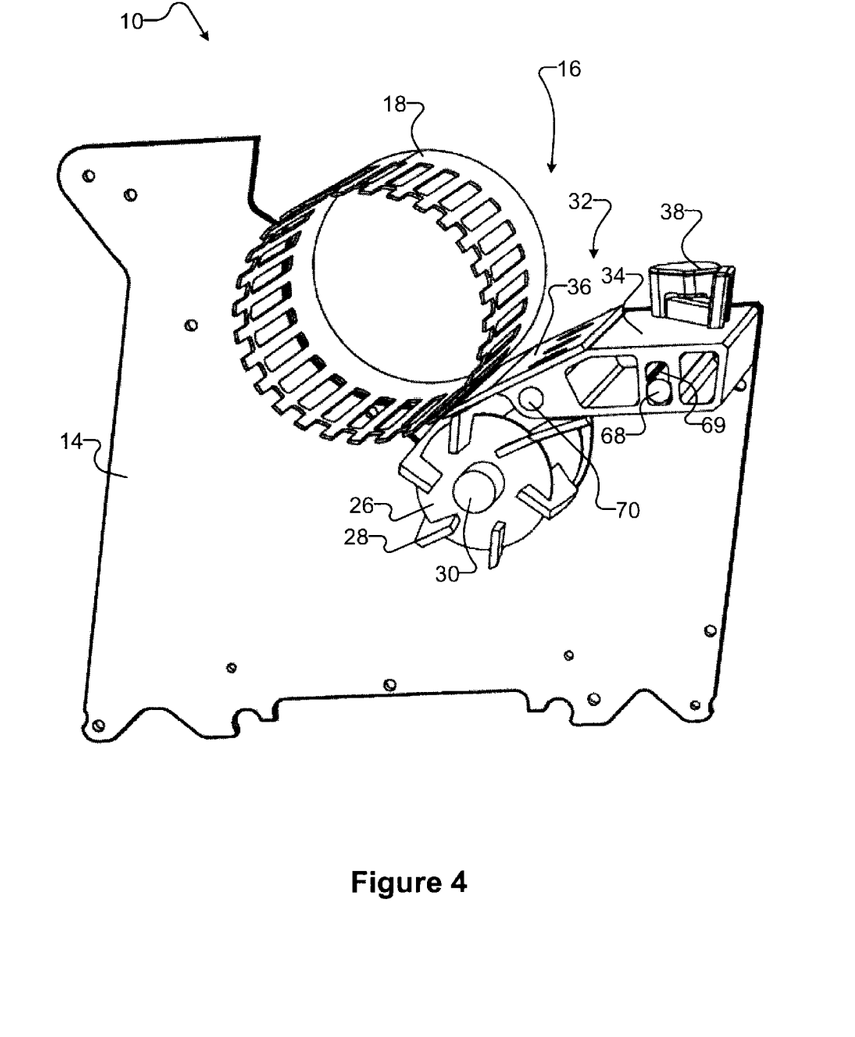
FIG. 4 is a sectional elevation view of the machine of FIG. 1 showing the cutting mechanism.

Tumbler support wheels 20A, 20B, 20C and 20D positioned at each end of the tumbler 18 support the tumbler for rotation about its longitudinal axis. The tumbler support wheels are positioned so as to surround the centrally-positioned tumbler 18. In the illustrated embodiment, the plant trimming machine 10 has four tumbler support wheels 20A, 20B, 20C, 20D at each end. As seen in FIG. 2, tumbler support wheels 20A, 20B are affixed to the removable lid 24, tumbler support wheel 20C is affixed to the end plate 14, 15 and tumbler wheel 20D is mounted on the bearing block assembly 100. Since the lid 24 is pivotable and not locked in position, the position of the tumbler support wheels 20A and 20B is not fixed; the position of the tumbler 18 is accordingly determined by the two lower support wheels 20C and 20D.

In some embodiments, the tumbler support wheel 20D is affixed to the end plate 14. 15 rather than to the bearing block assembly. Mounting it on the bearing block assembly, as illustrated, is preferred, in order that the bearing block assembly determines the position of the tumbler relative to the reel and bed knife.

The position of the bed bar assembly 32 relative to the reel 26 can be adjusted by means of left and right side adjustment levers 38. By adjusting the position of the bed bar assembly 32, the distance between the tip of the bed knife 36 and the reel blades 28 can be adjusted if necessary to optimize the shearing action. The adjustment levers 38 are each connected to a downwardly extending threaded bolt (not shown). The bottom end of the bolt is threadedly attached to a fixed pin 68 which extends within a chamber 69 in the bed bar across its length (see FIG. 4). Clockwise or counter-clockwise movement of the levers 38 turns the bolts to raise or lower the bed bar assembly 32, relative to the fixed pin 68, by means of the engagement of the threads of the bolt with the fixed pin 68. Accordingly, although the position of the bed bar assembly 32 relative to the reel 26 is set by the bearing block assemblies of the invention, as described below, it may nevertheless be desirable to make fine adjustments during the operation of the machine, and the adjustment levers 38 makes this possible.

Figure 6:
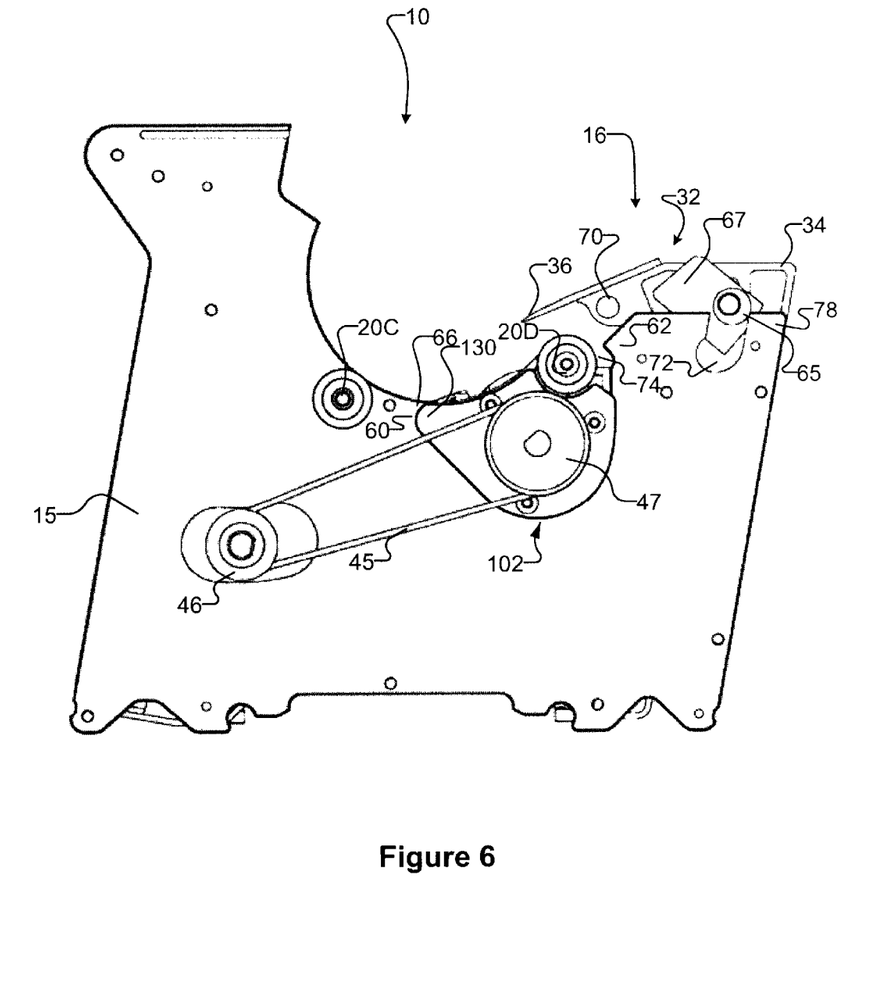
FIG. 6 is a schematic side view of the machine of FIG. 1, seen from the end opposite to FIG. 5, showing the bed bar assembly pivoted partly out of engagement with an end plate of the machine.

The plant trimming machine 10 has a motor 43 mounted on an inside wall of one end plate 15. A shroud (not shown) is mounted under the reel, configured to receive the trimmed-off parts of the plant material. The motor 43 is operable to drive the rotational movement of the reel 26 which in turn rotates the tumbler 18. A drive shaft 46 from the motor 43 is connected to a reel gear 47 by a belt 45 (FIG. 6). The rotary motion of the reel gear 47 and the reel 26 transmits a rotary motion to the tumbler 18 by means of the circumferential tumbler drive gear 54.

In operation, plant material that requires trimming is fed into the rotating tumbler 18. As the plant material is tumbled, the parts of the plant material that project out through the holes 22 in the tumbler 18 are cut by the cutting mechanism 16 in a scissor-like shearing action as the helical blades 28 of the rotating reel 26 contact the stationary bed knife 36. The cut material is conveyed through the shroud to a receiving receptacle (not shown).

Figure 5:
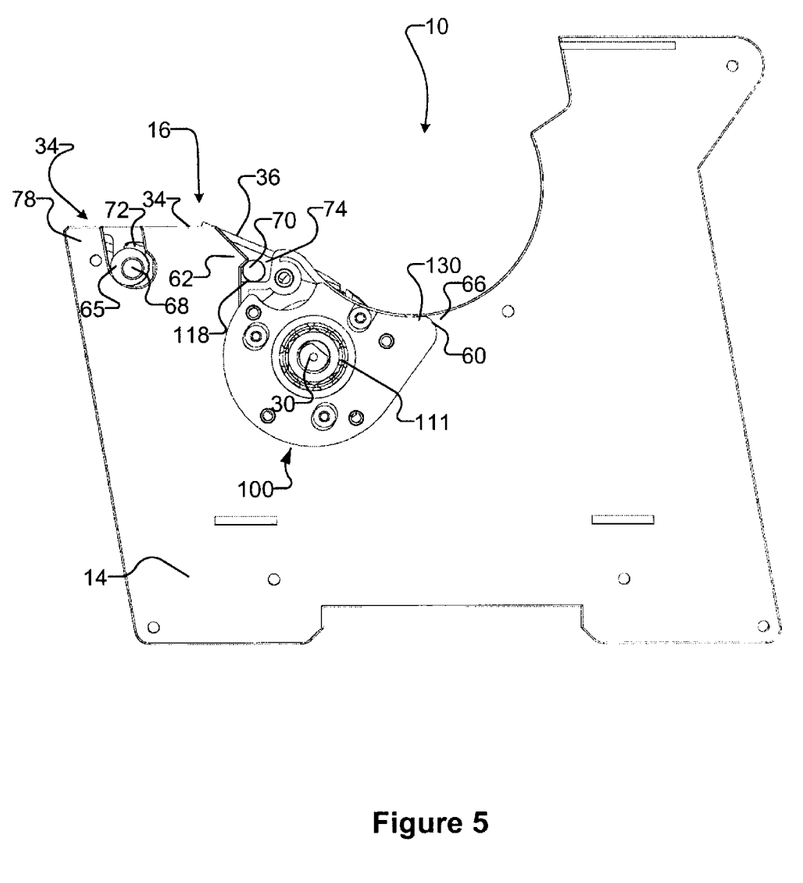
FIG. 5 is a schematic side view of the machine of FIG. 1 without its lid and tumbler.

FIGS. 5 and 6 are schematic side views of the plant trimming machine 10 without the tumbler 18 and the removable lid 24 and depict the connections between the components of the cutting mechanism 16 that are removably mounted to the end plates 14, 15. The rotatable shaft 30 of the reel 26 is received in the bearing block assemblies 100, 102, described in detail below.

The bearing block assembly 100 that engages with the left side end plate 14, is shown in detail in FIGS. 8A to 8D. The bearing block assembly 102 that engages with the right side end plate 15 is a mirror image thereof and accordingly, only bearing block assembly 100 is described in detail.

Figure 8A:
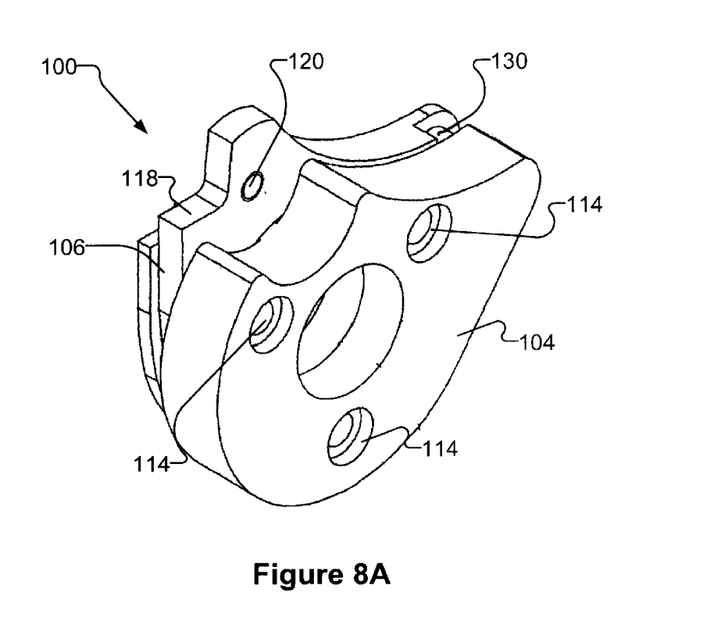
FIG. 8A is a perspective view of a bearing block assembly according to an embodiment of the invention.

The bearing block assembly 100 comprises an outer bearing block plate 104 and an inner bearing block plate 106. The terms "outer" and "inner" in reference to the plates or parts thereof refer to the plate or part facing outwardly or inwardly, respectively, relative to the machine 10, when the plates are affixed together to form the assembly 100 and mounted on the machine.

Figure 8B:
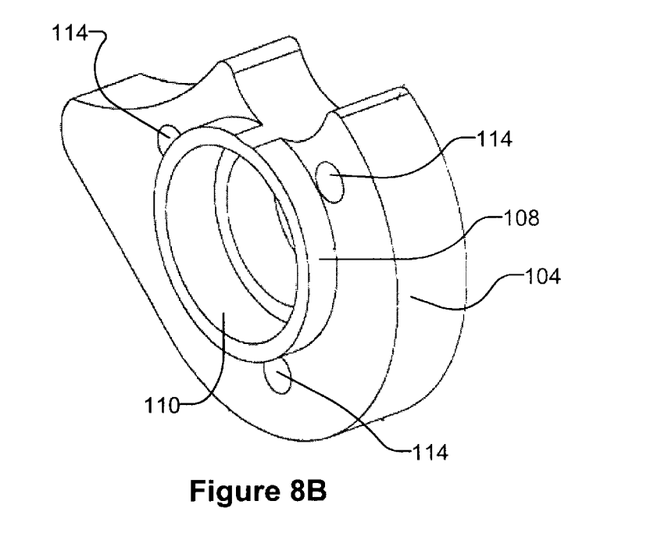
FIG. 8B is a perspective view of the outer bearing plate of the bearing block assembly.

The outer bearing plate 104 has a circular flange 108 on its inner side. A bore 110 formed by the flange 108 receives a bearing for rotatably supporting an end of the reel 26, specifically the reel shaft 30. The bearing 111 engages by a press fit within the bore 110, the bearing's outer race being in contact with the wall of the bore 110 and the bearing's inner race being in contact with the reel shaft 30.

Figure 8C:
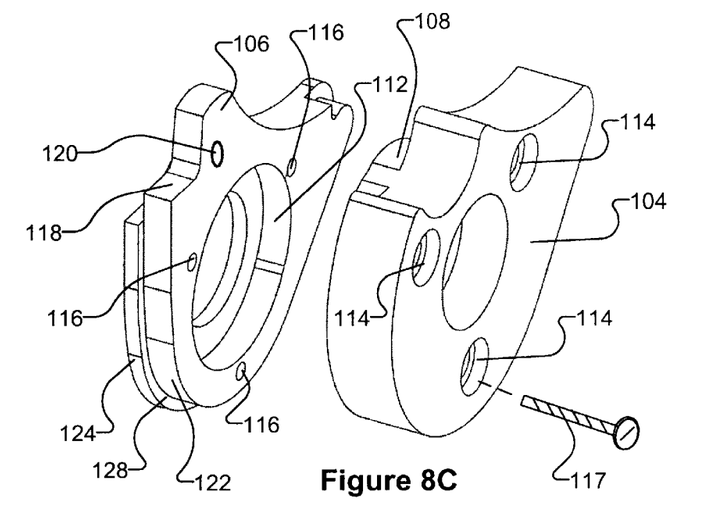
FIG. 8C is a perspective view of the outer bearing plate and the inner bearing plate.
Figure 8D:
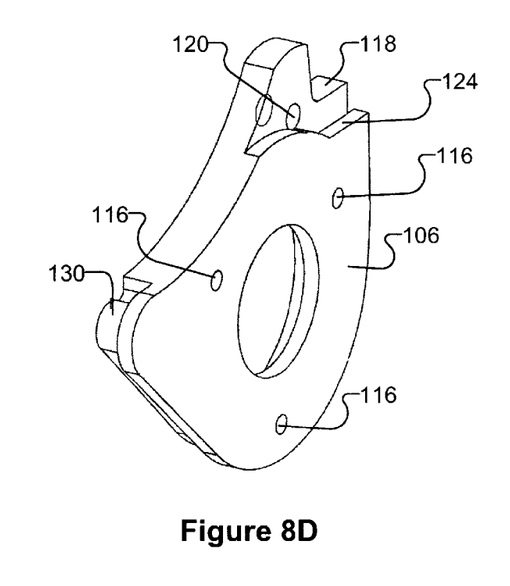
FIG. 8D is a perspective view of the inner bearing plate, seen from the side opposite to the view of FIG. 8C.

The inner bearing plate 106 has a pocket 112 which receives the flange 108 when the outer bearing plate 104 and the inner bearing plate 106 are affixed together to form the bearing block assembly 100. The outer bearing plate 104 has three slotted counterbored holes 114 which align with three respective screw holes 116 in the inner bearing plate. The two plates are attached together by means of screws 117 inserted into the holes 114 and engaging with the threads of the respective screw holes 116. Importantly, the relative radial positions of the outer 104 and inner 106 bearing plates can be set before the two plates are secured together. The pocket 112 has sufficient tolerance relative to the outer diameter of the flange 108, e.g., a tolerance of about 1 mm, and the slotted counterbored holes 114 have sufficient clearance that the two bearing plates 104, 106 can be secured together at a range of relative radial positions, thus permitting the flange 108 to be set at a desired radial position within the pocket 112. It is therefore possible to set the position of any particular reel 26 relative to the bed knife and the tumbler when initially assembling a machine 10, despite the variations in the dimensions of different reels. It is known in the art that reels are manufactured according to relatively loose tolerances.

The inner bearing plate 106 has features that set the positions of the bed knife 36 and the tumbler 18, relative to the reel 26. First, a contact surface 118 is provided for engagement with the fixed pin member 70 of the bed bar assembly 32. As seen in FIG. 5, in the assembled machine the fixed pin member 70 is supported on the contact surface 118. The position of the bed bar assembly, with the bed knife, is thus set relative to the inner bearing plate 106, the contact surface 118 functioning as a zero pin contact. Second, a bore 120 is provided in the inner bearing plate 106 for receiving a bearing for rotational support of the tumbler support wheel 20D, thus fixing the position of the tumbler 18 relative to the inner bearing plate 106.

The inner bearing plate 106 has an outer portion 122 and an inner portion 124 such that, when the plates 104, 106 are attached together to form the bearing block assembly 100, the outer portion 122 fits into the curved pocket or cut-out 126 of the end plate 14 and the inner portion 124 is positioned inward of the end plate 14, the inner portion 124 having a lip 128 that abuts the inner face of the end plate 14. The outer portion 122 of the inner plate 106 includes a rounded corner 130 for engagement with a shoulder 66 of the end plate 14.

It will be apparent from the foregoing that the bearing block assemblies 100, 102, in the assembled machine 10, set the relative positions of the reel 26 (by virtue of the fixed position of the bore 110), the bed knife 36 (by virtue of the position of the fixed pin member 70 on the contact surface 118) and the tumbler 18 (by virtue of the tumbler bearing bore 120 in the inner bearing plate 106). It is intended that the outer bearing plate 104 and the inner bearing plate 106 are affixed together permanently when the machine 10 is initially assembled, in a position suitable for the particular reel 26 that is being installed in the machine, and would not be disassembled during subsequent cleaning and maintenance (unless the reel were being replaced). By virtue of the fixed relative positions of the three key operative components of the machine. i.e., the reel, the bed knife and the tumbler, disassembly and reassembly, e.g., for cleaning and maintenance, can be done easily and without having to re-set the relative positions of these components. The bearing block assemblies 100, 102 ensure that these three components will be in the correct positions following reassembly.

The bearing block assemblies 100, 102, with the attached reel 26, and the bed bar assembly 32, are removably locked to the end plates 14, 15, by means of two cam lever mechanisms, one adjacent to each of the end plates 14, 15. The cam lever mechanism comprises a manually-operable lever 67 to rotate an eccentric cam 65 and thus release the fixed pin member 70 of the bed bar assembly 32 from the end plates 14, 15. The cam lever mechanism is securely affixed to the bed bar assembly 32. The eccentric cam 65 is removably mounted in a cam-receiving aperture 72 of each end plate 14, 15, and the fixed pin member 70 is removably mounted in a notch 74 in each end plate 14, 15. The cam-receiving aperture 72 is positioned adjacent to a top edge 78 of the end plates 14, 15. The notch 74 is positioned between a shoulder 62 of each end plates 14, 15 and a side of the bearing block assembly 100, 102, such that the fixed pin member 70 is removably engageable both with the end plates 14, 15 and the bearing block assemblies 100, 102.

Figure 7:
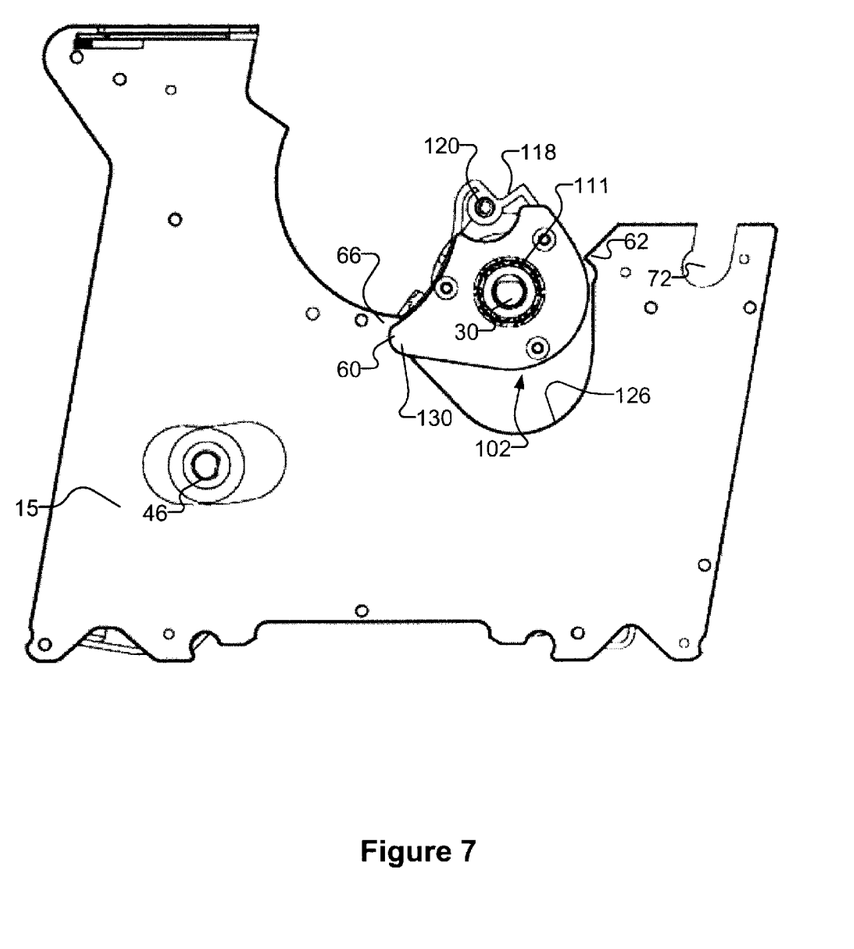
FIG. 7 is a schematic side view of the embodiment of FIG. 1, seen from the end opposite to FIG. 5, showing the bearing block assembly pivoted partly out of engagement with an end plate of the machine.

The cam-operating levers 67 are pivotable upwards into an unlocking position shown in FIG. 6, and downwards into the lock position shown in FIG. 5. Referring to FIG. 5, when the cam-operating lever 67 is in the locking position. It is located between an inner side of the end plate 14, 15 and the bed bar assembly 32 (and is thus not visible in FIG. 5), and the bed bar assembly 32 and the bearing block assemblies 100, 102 are securely attached to the respective end plate 14, 15. As illustrated in FIG. 6, when the cam-operating lever 67 is pulled upwards into the unlocking position, the bed bar assembly 32 moves laterally (to the left in the view of FIG. 6 or to the right in the view of FIG. 5), freeing the pin member 70 from the shoulder 62 of the end plate 14,15, such that the pin member 70 can be removed from the notches 74. As a result of the pin member 70 being released from the notches 74, the eccentric cams 65 can be lifted out of the cam-receiving apertures 72 of the respective end plate 14, 15, and the bed bar assembly 32 removed from the machine 10 (as seen in FIG. 6). The bearing block assemblies 100, 102, with the attached reel 26 and reel gear 47, can then be pivoted and removed from the end plates 14, 15 by an upward rotation of the bearing block assemblies 100, 102 about the pivot point 60, freeing the corners 130 from the end plate shoulders 66 (shown in FIG. 7). As the bearing block assemblies 100, 102 and the reel 26 are securely attached to each other, they are removed from the machine 10 as a single unit. Consequently, when the two cam-operating levers 67 are in their unlocking positions, the cutting mechanism 16 can be removed from the machine 10.

Throughout the foregoing description and the drawings, in which corresponding and like parts are identified by the same reference characters, specific details have been set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

As will be apparent to those skilled in the art in the light of the forgoing disclosure, many alterations and modifications are possible in the practice of this invention without departing from the scope thereof. Accordingly, the scope of the invention is to be construed in accordance with the following claims.

The invention claimed is:

1. A plant-trimming machine comprising a rotatable perforated tumbler, a rotatable reel, a bed bar assembly, and a bearing block assembly, the bearing block assembly comprising:
    (a) a first bearing plate having a first bearing-receiving bore for holding a reel bearing to rotatably support an end of the reel;
    (b) a second bearing plate affixed to the first bearing plate, the second bearing plate comprising:
        (i) a pocket for receiving the first bearing-receiving bore of the first bearing plate, the pocket having a tolerance permitting the first bearing-receiving bore to be set at a selected position within the pocket; and
        (ii) a contact surface supporting the bed bar assembly; and
    (c) connectors for affixing the first bearing plate to the second bearing plate.

2. The plant-trimming machine according to claim 1, wherein the second bearing plate further comprises a second bearing-receiving bore for holding a tumbler bearing for a rotatable tumbler support.

3. The plant-trimming machine according to claim 1, wherein the first bearing-receiving bore of the first bearing plate defines an inner circumference of a flange on the first bearing plate, and the flange is received in the pocket of the second bearing plate.

4. The plant-trimming machine according to claim 1, further comprising an end plate, wherein the second bearing plate is shaped to fit within a cut-out in the end plate.

5. The plant-trimming machine according to claim 1, further comprising an end plate, wherein the second bearing plate comprises a first portion shaped to fit within a cut-out in the end plate and a second portion shaped to be positioned adjacent to the end plate.

6. The plant-trimming machine according to claim 1, further comprising the reel bearing in the first bearing-receiving bore.

7. The plant-trimming machine according to claim 2, further comprising the tumbler bearing for the rotatable tumbler support in the second bearing-receiving bore.

8. The plant-trimming machine according to claim 1, further comprising two end plates, and a second bearing block assembly, the second bearing block assembly comprising:
    (a) a first bearing plate having a first bearing-receiving bore for holding a reel bearing to rotatably support an end of the reel;
    (b) a second bearing plate affixed to the first bearing plate, the second bearing plate comprising:
        (i) a pocket for receiving the first bearing-receiving bore of the first bearing plate, the pocket having a tolerance permitting the first bearing receiving bore to be set at a selected position within the pocket; and
        (ii) a contact surface supporting the bed bar assembly; and
    (c) connectors for affixing the first bearing plate to the second bearing plate.

9. A plant-trimming machine comprising a rotatable tumbler, a rotatable reel, a bed bar assembly, and a bearing block assembly, the bearing block assembly comprising:
    (a) a first bearing plate having a first bearing-receiving bore for holding a reel bearing to rotatably support an end of the reel; and
    (b) a second bearing plate affixed to the first bearing plate, the second bearing plate comprising:
        (i) a pocket for receiving the first bearing-receiving bore of the first bearing plate, the pocket having a tolerance permitting the first bearing-receiving bore to be set at a selected position within the pocket; and (ii) a contact surface supporting the bed bar assembly.

10. The plant-trimming machine according to claim 9, wherein the second bearing plate further comprises means for supporting a tumbler bearing for a rotatable tumbler support.

11. A plant-trimming machine comprising a rotatable tumbler, a rotatable reel, a bed bar assembly, and a bearing block assembly, the bearing block assembly comprising:

(a) a first bearing plate having means for rotatably supporting an end of the reel;

(b) a second bearing plate affixed to the first bearing plate, the second bearing plate comprising:

(i) means for setting the means for rotatably supporting an end of the reel of the first bearing plate at a selected position relative to the second bearing plate; and (ii) means for engaging the bed bar assembly.

12. The plant-trimming machine according to claim 11, wherein the second bearing plate further comprises means for rotatably supporting the tumbler.

\* \* \* \* \*